No. 721,229. PATENTED FEB. 24, 1903.
O. H. & A. F. PIEPER.
MOTOR.
APPLICATION FILED SEPT. 20, 1901.
NO MODEL.
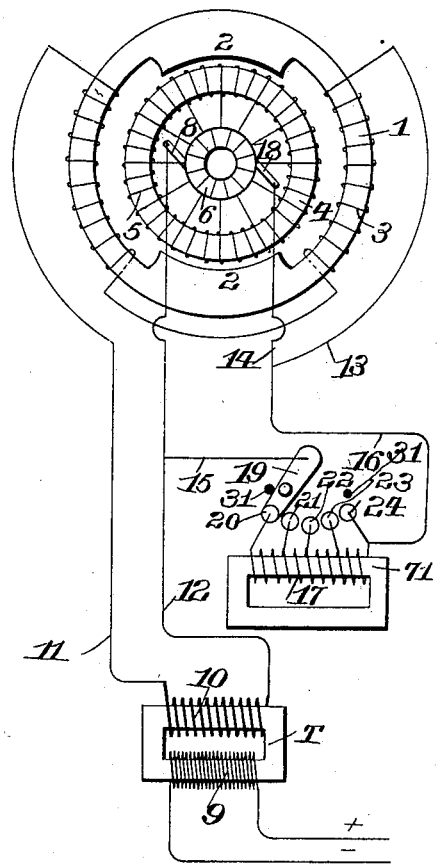
Witnesses.
Walter R. Payne
G. Willard Rich
Inventors,
Oscar H. Pieper
Alphonse F. Pieper
by Frederick S. Church
their Attorney

UNITED STATES PATENT OFFICE.

OSCAR H. PIEPER AND ALPHONSE F. PIEPER, OF ROCHESTER, NEW YORK.

MOTOR.

SPECIFICATION forming part of Letters Patent No. 721,229, dated February 24, 1903.

Application filed September 20, 1901. Serial No. 75,923. (No model.)

*To all whom it may concern:*

Be it known that we, OSCAR H. PIEPER and ALPHONSE F. PIEPER, of Rochester, in the county of Monroe and State of New York, have invented certain new and useful Improvements in Motors; and we do hereby declare the following to be a full, clear, and exact description of the same, reference being had to the accompanying drawings, forming a part of this specification, and to the reference characters marked thereon.

Our present invention relates to electric motors adapted for alternating currents and to certain improvements relating to and means for controlling them, whereby they may be started with the necessary torque, and when the armature is under full speed it can be instantly stopped and, if desired, its direction of movement reversed without the use of clutches, brakes, or other mechanical holding devices.

The invention, which is designed more particularly for small motors intended for operating dental engines or machines where accurate speed regulation is the leading requisite, relates to alternating-current motors of the direct-current type having the usual laminated field-magnets and the windings designed for a relatively high electromotive force or relatively high self-induction, armature-coils designed for a relatively low electromotive force or having a relatively low self-induction, commutator and commutator-brushes arranged at the neutral point, said field and armature windings being connected in series; and the novel features of the invention relate to the control of the speed of such motors by the employment of an induction-winding in shunt with the armature-brushes, and the accurate regulation of the motor is accomplished by varying the turns on the inductive winding.

The drawing shows a diagrammatic view illustrating our motor and the means for regulating the same.

In the motor shown in the drawing, 1 indicates a laminated field-magnet of the ring type, having the pole-pieces 2 and the field-windings 3, designed for a relatively high electromotive force or relatively high self-induction.

4 indicates the armature, provided with the armature-coils 5, designed for a relatively low electromotive force or having a relatively low self-induction, said coils being connected at intervals with sections 6 of the commutator.

8 and 18 indicate the commutator-brushes, coöperating with the commutator and arranged to contact with the coils which are in the neutral point of the magnet, being at an angle of ninety degrees to the axis of the poles.

In the drawing the source of current for supplying the motor is a transformer, (indicated by T,) the primary coil 9 being in the high-tension circuit and the secondary coil 10 being connected by wire 11 with one of the field-coils, the other conductor 12 leading to the brush 8.

13 indicates a wire leading from the field-coil and to which the brush 18 is connected by wire 14, and a shunt is formed between the conductor 13 and the conductor 12 embodying the conductors 15 and 16, inductive coils 17 on a closed magnetic circuit core 71, and a movable switch-arm 19, coöperating with the contacts 20 21 22 23, connected to the coils of the inductive winding and also with the contact 24, connected to the end of said winding 17. The arm 19 coöperates at the extremes of movement with the pins 31, which are so arranged that the shunt between the armature-terminals is permanent and is never opened entirely whether the motor is operating at full speed or is at rest, although the inductive winding is capable of variation to vary the speed.

While it is impracticable to state exactly the proper ratio or relation existing between the ampere-turns in the field and armature coils, as this will vary with different motors and also with the load, we find that the field-magnet windings must have a relatively high self-induction or be designed for a relatively high electromotive force—as, for instance, one hundred and ten volts—and the armature-windings a relatively low self-induction or designed for a relatively low electromotive force—as, for instance, about eighteen or twenty volts—or, to express it differently, the field might have two hundred ampere-turns and the armature eleven and one-half ampere-turns.

While we have shown a magnet having only two pole-pieces, it is obvious that a multipolar machine could be used.

The field-windings, armature-coils, (excepting the inductive winding,) the commutator, and brushes are connected in series, as in constant-current motors, and when the motor is operating at full speed the switch 19 in the shunt engages contact-point 20, so that the entire inductive winding 17 is in the shunt. By moving the switch-arm 19 from this position toward the contact 24 the speed of the motor may be reduced as desired, more and more of the winding-coils 17 being out of the shunt and a greater portion of current allowed to pass through it; but when the switch reaches the contact 24, the winding then being all cut out, the machine is short-circuited and brought to an immediate stop, and there is no tendency on the part of the armature to rotate.

In another pending application, Serial No. 710,366, we have described and claimed the employment of a shunt across the armature of a motor of this type and connected in the manner described; but we find that with the induction-winding on a closed magnetic core the regulation and control of the motor are accomplished without as great a loss of energy. For instance, to operate a certain motor properly it requires thirty-six volts at the brushes. This would require a resistance of nine ohms at four amperes or one hundred and forty-four watts loss; but with our inductive winding we accomplish the same result with 1.75 ohms resistance at same amperes at a loss of only twenty-eight watts.

We claim as our invention—

1. In combination in a motor for alternating currents, field-windings, armature-coils, commutator, and commutator-brushes, connected in series as customary in constant-current motors, and an inductive winding forming a shunt around the commutator-brushes.

2. In combination in a motor for alternating currents, field-windings, armature-coils, commutator, and commutator-brushes, connected in series as customary in constant-current motors, and an inductive winding wound on a closed magnetic core and forming a shunt around the commutator-brushes.

3. In combination in a motor for alternating currents, field-windings, armature-coils, commutator, and commutator-brushes, connected in series as customary in constant-current motors, and a variable inductive winding forming a shunt around the commutator-brushes, adapted to vary the voltage between the armature-terminals.

4. In an electric motor for alternating currents, the combination with field-windings designed for relatively high self-induction or relatively high electromotive force, armature-coils designed for relatively low self-induction or relatively low electromotive force, and commutator and commutator-brushes at the neutral point and all arranged in series, of a variable inductive winding in shunt around the armature-terminals.

OSCAR H. PIEPER.
ALPHONSE F. PIEPER.

Witnesses:
G. WILLARD RICH,
WALTER B. PAYNE.